United States Patent [19]

Toshimitsu et al.

[11] Patent Number: 5,471,104
[45] Date of Patent: Nov. 28, 1995

[54] DRUM MOTOR FOR VCR

[75] Inventors: Manabu Toshimitsu, Kanagawa;
Shunichi Aiyoshizawa, Tokyo;
Yoshikazu Suganuma; Daisuke Konno, both of Kanagawa, all of Japan

[73] Assignee: Ebara Corporation, Tokyo, Japan

[21] Appl. No.: 109,706

[22] Filed: Aug. 19, 1993

[30] Foreign Application Priority Data

Aug. 20, 1992 [JP] Japan .................... 4-244181

[51] Int. Cl.⁶ ............................ H02K 7/14; H02K 7/08
[52] U.S. Cl. ............................. 310/90; 310/67 R
[58] Field of Search .................. 310/67 R, 90, 310/90.5; 384/100, 107; 369/266; 360/96.3; 254/362

[56] References Cited

U.S. PATENT DOCUMENTS

| 3,383,141 | 5/1968 | de Bennetot | 310/90.5 |
| 3,950,039 | 4/1976 | Huber et al. | 384/112 |
| 4,839,546 | 6/1989 | Kitahara | 310/51 |
| 5,019,738 | 5/1991 | Weilbach et al. | 310/90.5 |

FOREIGN PATENT DOCUMENTS

| 2535852 | 2/1977 | Germany . |
| 57-12828 | 1/1982 | Japan . |
| 61-204864 | 9/1986 | Japan . |
| 63-176813 | 7/1988 | Japan . |

OTHER PUBLICATIONS

Patent Abstracts of Japan, vol. 14, No. 222 (E–926) (4165) May 10, 1960.
Patent Abstracts of Japan, vol. 16, No. 74 (E–1170) Feb. 24, 1992.

*Primary Examiner*—Clayton E. LaBalle
*Attorney, Agent, or Firm*—Wenderoth, Lind & Ponack

[57] ABSTRACT

A drum motor for a VCR includes radial and thrust hydrodynamic bearings that are composed of a rotor-side bearing member formed by bringing a pair of first and second thrust plates into direct contact with both end surfaces of a radial bearing element and integrating them into one unit, and a stator-side bearing member in the form of a radial sleeve the inner peripheral surface and both end surfaces of which respectively cooperate with the outer peripheral surface of the radial bearing element and the mutually facing surfaces of the first and second thrust plates. A rotor magnet is secured to a rotating shaft. A motor casing is secured to the outer peripheral surface of the radial sleeve. A stator unit is secured to the motor casing. A dynamic pressure generating groove is provided on either each end surface of the radial sleeve or each of the mutually facing surfaces of the first and second thrust plates. The run-out of a rotor-side unit in both the thrust and radial directions is made extremely small and the change in the relative height of the rotor-side unit in the thrust direction due to a change of the position of the motor in which it is used is minimized.

14 Claims, 9 Drawing Sheets

DRUM MOTOR FOR VCR

BACKGROUND OF THE INVENTION

1. Field of the Invention

The present invention relates to a drum motor for a VCR (Video Cassette Recorder; a cassette VTR) which employs hydrodynamic bearings as radial and thrust bearings. More particularly, the present invention relates to a drum motor for a VCR which rotates with minimal vibration, satisfies the demand for higher recording densities of a VCR and has excellent durability and reliability.

2. Prior Art

VCR systems for business use are now shifting from analog recording to digital recording, to attain higher recording densities. As one of the measures taken to increase recording density, it is common practice to narrow the width and pitch of tracks recorded on a magnetic tape. To realize this, a technique of minimizing the run-out of the rotor-side unit is indispensable.

FIG. 9 is a fragmentary sectional view of a conventional drum motor for a VCR. Referring to FIG. 9, a rotating shaft 104 is rotatably supported by the inner peripheral surface 101a of the bottom center of a motor casing 101 and the inner peripheral surface 101b of the top center or the motor casing 101 through ball bearings 102 and 103. A flange 105 is secured to the outer periphery of the upper end of the rotating shaft 104 so that a rotor-side unit 110 can be mounted thereon. A rotor magnet 106 of a motor part for driving the rotating shaft 104 to rotate is coaxially secured to the outer periphery of the central portion of the rotating shaft 104 through a cylindrical back yoke 107 made of a magnetic material or the like. A stator core 108 is secured to the inner peripheral surface of the motor casing 101 in an opposing relation to the rotor magnet 106.

Incidentally, in the above-described drum motor, a stator-side unit 109 is generally secured to the top of the motor casing 101, whereas the rotor-side unit 110 is secured to the flange 105 to constitute a drum unit. A magnetic tape for recording is wound on both the outer peripheral surface 109a of the stator-side unit 109 and the outer peripheral surface 110a of the rotor-side unit 110, and in this state, the tape is fed at a constant speed so that recording tracks are provided on the magnetic tape by means of a magnetic head 111 attached to the rotor-side unit 110a.

In the conventional drum motor employing ball bearings, however, the magnitude of vibration of the rotating shaft 104 depends on the bearing clearance of the ball bearings 102 and 103. The vibration in the radial direction is substantially equal to the radial clearance of the ball bearings 102 and 103, while the vibration in the thrust direction is substantially equal to the thrust clearance of the ball bearings 102 and 103. To minimize the bearing clearance, various schemes have been devised, for example, application of a preload to the ball bearings 102 and 103. However, the non-repeatable run out, i.e. the non-repeatable component of vibration in the radial and axial directions, which cannot be removed even after a coaxial machining of the flange to remove vibration thereof, is of the order of 0.3 to 0.5 microns, and the minimization of the vibration of the rotating shaft 104 has already reached the limit due to problems peculiar to ball bearings. Thus, the vibration of the rotating shaft 104 is a serious obstacle to the achievement of a higher recording density on magnetic tape.

On the other hand, as a device for realizing a rotational performance of high accuracy, there is a drum motor that employs hydrodynamic bearings, as shown in Japanese Patent Application Post-Exam Publication No. 63-64645. FIG. 10 schematically shows the structure of this drum motor. Referring to FIG. 10, a disc 123 is rotatably fitted on a fixed shaft 121, and a thrust bearing member 124 is attached to the top of the disc 123. The fixed shaft 121 is provided at two portions thereof with radial grooves 126A and 126B, which constitute a radial hydrodynamic bearing in combination with the inner peripheral surface of the disc 123. In addition, the end surface of the fixed shaft 121 and the thrust bearing member 124, which faces it, constitute in combination a thrust hydrodynamic bearing. Thus, the disc 123 is rotatably supported on the fixed shaft 121 without coming into solid contact with it. Accordingly, it is possible to rotate the disc 123 smoothly with minimal vibration and high accuracy in comparison to the conventional drum motor employing ball bearings.

However, it is necessary in order to narrow the recording track pitch, as described above, to reduce the run-out of the rotor-side unit. In particular, vibration in the thrust direction and a change in the relative height between the rotary portion and the stationary portion in the thrust direction directly obstruct the achievement of a reduction in the track pitch.

Further, with the arrangement of the thrust hydrodynamic bearing in the prior art shown in FIG. 10, the thrust load bearing direction is limited to one. Therefore, the force that is produced in the thrust hydrodynamic bearing during the rotation of the rotating shaft is equal to the thrust load and will never exceed it. Further, the amount of levitation of the thrust bearing is a function of the hydrodynamic force and the thrust load. Therefore, if the thrust load changes due to a change of the position or attitude in which the motor is used, the amount of thrust levitation changes substantially according to the change in the thrust load. For example, when the motor is used in a horizontal position, the thrust load is approximately zero, and the amount of thrust levitation is infinite. In an extreme case, the rotor-side unit may fall off and break down.

To overcome these disadvantages, the conventional drum motor is arranged such that a change in the amount of levitation of the thrust bearing due to a change of the position in which the motor is used, that is, a change in the relative height of the rotor-side unit relative to the stationary-side unit in the thrust direction, is reduced by using the axial attraction force of a permanent magnet 138, thereby enabling the motor to be used even in a horizontal position. However, in the conventional drum motor shown in FIG. 10, the permanent magnet 138 is disposed to face an iron piece 142 to exert an attraction force in the downward direction, i.e., the direction of the arrow X. Accordingly, when the motor is used in a vertically upward position, the attraction force of the permanent magnet 138 and the weight of the rotor act in the same direction, and the thrust load is the sum of the attraction force of the permanent magnet and the weight of the rotor, which increases the wear of sliding surfaces of the bearing members.

Further, in general, in order to minimize the amount of levitation of the rotor when the motor is used in a horizontal position, it is necessary to reduce the difference between the thrust load of the motor when used in a horizontal position and the thrust load of the motor when used in a vertically upward position. However, in the conventional drum motor shown in FIG. 10, when the motor is used in a horizontal position, the thrust load is only the attraction force of the permanent magnet, and the rate $\epsilon$ of relative change of the thrust load is expressed by ε = (attraction force of permanent magnet)/
(attraction force of permanent magnet +
weight of rotor)

Therefore, in order to minimize the relative change of the thrust load to make the change rate ε in the above expression approach 1, it is necessary to increase the attraction force of the permanent magnet relative to the weight of the rotor.

It is reported that in the prior art shown in FIG. 10 the change in the relative height of the rotor-side unit due to a change of the position in which the motor is used has been reduced to 0.5 microns by setting the attraction force of the permanent magnet at a level double the weight of the rotor (i.e., ε=0.67). With the bearing structure shown in this prior art, however, normal operation cannot be expected when the motor is used in an inverted position. Namely, in an inverted position of the motor, the numerator of the above expression is expressed as attraction force of permanent magnet − (minus) weight of rotor. Hence, it is necessary in order to make the change rate ε approach 1 to further increase the attraction force of the permanent magnet. Consequently, an excess thrust load is applied to the thrust bearing.

An excess thrust load causes an increase in the starting torque of the motor and also accelerates wear on the bearing sliding surfaces due to the repetition of start and stop, giving rise to problems in terms of durability. Further, it may be inferred that the prior art shown in FIG. 10 gives no consideration to the normal operation of the motor in an inverted position from the fact that it needs a stopper ring 139 for preventing the rotor-side unit from falling off when the motor is in an inverted position.

Further, in the above-described prior art, the thrust bearing is composed of the end surface of the fixed shaft 121 and the thrust bearing member 124, which faces it. Therefore, the outer diameter of the thrust dynamic pressure generating surface cannot be increased as desired, and hence the thrust load bearing capacity is low relative to the radial load bearing capacity. Accordingly, a high-viscosity fluid, e.g., lubricating oil, is used in this type of hydrodynamic bearing because if a non-viscosity fluid like air is employed, the load bearing capacity, particularly that of the thrust bearing is insufficient in general. However, the viscosity of lubricating oil shows a logarithmic change with temperature and becomes particularly high at low temperatures. This implies that a temperature change causes a change in the amount of levitation of the thrust bearing, leading to a change in the relative height of the rotor-side unit and other problems related thereto.

There are also problems in terms of reliability, for example, degradation of the performance caused by a drying up of lubricating oil due to scattering or leakage thereof or contamination of the parts surrounding the bearing by lubricating oil, and other problems, for example, an increase in the motor current due to an increase in the bearing torque at low temperatures.

Under these circumstances, an H-shaped bearing structure similar to the bearing of the drum motor according to the present invention, which has two thrust plates, has been proposed as disclosed in the specification of U.S. Pat. No. 3,950,039. FIG. 11 schematically shows the H-shaped bearing structure. Referring to FIG. 11, two thrust plates 203 are brought into direct contact with both end surfaces of a radial bearing member 205, and these plates and the bearing member are secured to a fixed shaft 204 by tightening a nut 208, for example. In the H-shaped bearing structure, the two thrust plates 203 are provided with respective dynamic pressure generating parts 209 such that the directions of dynamic pressures generated are opposite to each other.

Thus, the bearing rigidity in the thrust direction is determined by clearances at both ends of the thrust bearing. By reducing the clearances, the bearing rigidity can be enhanced, and it is possible to realize a hydrodynamic bearing having high rigidity even if air is employed as a fluid. In addition, it is possible to minimize the change of the position of the rotor in the thrust direction due to a change of the position of the motor in which it is used, and it is possible to eliminate the need for the attraction force in the thrust load direction by the permanent magnet as shown in FIG. 10.

However, a bearing having the structure shown in FIG. 11 also suffers from problems. For example, if an improper torque is applied for tightening the nut 208, the thrust plates 203 are deformed. As a result, the expected uniform clearances cannot be ensured, and the expected bearing performance cannot be obtained. To cope with such problems, attempts have been made to minimize the deformation of the thrust plates 203, for example, by setting the tightening torque at a level which is a fraction of the standard value (i.e., the torque at which the tensile force arising from the axial force caused by the bolt tightening torque reaches 70% of the yield point of the material concerned). With this method, however, it is impossible to sufficiently ensure the force required to secure the rotor-side bearing member to the rotating shaft. Accordingly, when the shaft-side members are used as a rotor in the above-described H-shaped bearing structure, reliability during high-speed rotation is unsatisfactory in view of the influence of centrifugal force acting on the bearing during rotation.

In a case where a rotating shaft 5 is provided with a flange 10 for mounting a rotor-side unit, e.g., a recording head, a rotary drum, etc., as shown in FIG. 12, since the rotor-side unit is mounted directly on the flange 10, the accuracy of rotation of the flange 10, i.e. coaxial rotation of the flange and the rotary shaft, directly determines the accuracy of rotation of the rotor-side unit. Therefore, it is necessary in order to realize higher recording densities of VCR to raise the rotational accuracy of the flange 10. To minimize the run-out of the flange 10 during rotation, it is a general practice to machine the rotor-side unit mounting surface 10b of the flange 10 after it has been secured to the rotating shaft 5 so that the unit mounting surface 10b is perpendicular to the rotational axis of the rotating shaft 5 (coaxial machining), thereby obtaining a desired degree of rotational accuracy.

However, the flange 10 is secured to the rotating shaft 5 by means, for example, of a locking member, e.g., a locking nut 11 which clamps the center portion of the flange. In this case, the machined surface 10b is deformed with time, as shown by a2 in FIG. 12, even after the flange 10 has been machined coaxially, by the clamping stress, i.e. uneven residual stress in the flange, imposed by the locking nut 11, for example, thus giving rise to problems such as an increase in the run-out of the machined surface 10b. In addition, the clamping stress exerted by the locking nut 11 causes deformation of a stepped portion 5a provided on the rotating shaft 5 and further causes a rotor-side bearing member 17 to be deformed as shown by a1 in the figure. To prevent such deformation, it has been a conventional practice to lengthen the axial dimension l1 of the stepped portion 5a to thereby increase the rigidity. However, an increase in the axial dimension l1 results in an increase in the overall length of the rotating shaft 5. Thus, such a conventional practice is an obstacle to a reduction in the overall size of the motor.

Although attempts have been made to minimize the deformation of the flange 10 and the rotor-side bearing member 17 by setting the tightening torque of the locking nut 11 at a level which is one over several (in a fractional expression) of the standard value, the force required to secure the flange 10 cannot sufficiently be ensured by this method, and satisfactory reliability cannot be obtained. In many cases, the flange 10 is made of the same material as that used to form a rotary drum or other member mounted thereon, e.g., an aluminum alloy, because the coefficient of linear expansion of the flange 10 needs to be coincident with that of the member mounted thereon.

On the other hand, the rotating shaft is formed by using stainless steel or other similar material in many cases, although it is different in the coefficient of linear expansion From a material used for the bearing members, e.g., a ceramic material, by taking into consideration the rigidity and workability of such material. Thus, the rotor is composed of a combination of different kinds of materials, which have different coefficients of linear expansion, and it is likely that the bearing members and the flange will be deformed or displaced at the joint due to a change in temperature. Accordingly, it is extremely difficult to maintain rotation of high accuracy over the entire range of temperatures at which the motor is used.

SUMMARY OF THE INVENTION

In view of the above-described circumstances, it is an object of the present invention to eliminate the above-described problems of the prior art and provide a drum motor for VCR which is designed so that the bearing rigidity in both the upward and downward thrust directions is enhanced to a level not lower than that in the radial direction, thereby minimizing the run-out of the rotor-side unit in both the thrust and radial directions and also minimizing the change in the relative height of the rotor-side unit in the thrust direction due to a change of the position of the motor in which it is used, and thus enabling the motor to exhibit excellent performance over the entire range of service temperatures without a restriction on the position in which the motor can be used in a practical application.

To solve the above-described problems, the present invention provides a drum motor for a VCR including radial and thrust hydrodynamic bearings which are composed of a rotor-side bearing member formed by bringing a pair of first and second thrust plates, at least sliding portions of which are made of a ceramic material, into direct contact with both end surfaces, respectively, of a cylindrical radial bearing element at least a sliding portion of which is made of a ceramic material, and integrating the first and second thrust plates and the radial bearing member into one unit, and a stator-side bearing member comprising a cylindrical radial sleeve, at least sliding portions of which are made of a ceramic material. The radial sleeve is disposed to face the rotor-side bearing member so that the inner peripheral surface and both end surfaces of the radial sleeve respectively cooperate with the outer peripheral surface of the radial bearing element and the mutually facing surfaces of the first and second thrust plates. A rotating shaft extends through a through-hole provided in the center of the rotor-side bearing member. The rotor-side bearing member is secured to the rotating shaft by a locking member provided on the rotating shaft. The drum motor further includes a rotor magnet of a motor part for driving the rotating shaft. The rotor magnet is secured to the rotating shaft. A motor casing is secured at the inner peripheral surface thereof to the outer peripheral surface of the radial sleeve. A stator unit is secured to the motor casing so as to face the rotor magnet of the motor part. Further, a dynamic pressure generating groove is provided on either each end surface of the radial sleeve, or each of the mutually facing surfaces of the first and second thrust plates.

The following arrangements should preferably be adopted in a first drum motor of this invention.

The rotating shaft has a stepped portion with an enlarged radius which is defined by a radially extended portion of the rotating shaft, and an abutting surface defined by a flat surface of the stepped portion which extends at right angles to the axial direction of the rotating shaft. One end surface of the first thrust plate is in direct contact with the abutting surface. The rotor magnet is axially secured to a cylindrical back yoke made of a magnetic material. The rotating shaft extends through a through-hole provided in the center of the back yoke. The back yoke has a flat end surface extending at right angles to the through-hole of the back yoke. The end surface of the back yoke is In direct contact with one end surface of the second thrust plate. The rotating shaft, the rotor-side bearing member, the first and second thrust plates and the back yoke are integrated into one unit by axially pressing the rotor-side bearing member, i.e., the radial bearing element and the first and second thrust plates and the back yoke against the abutting surface with a predetermined force by using the locking member provided on the rotating shaft.

At least one of the outer diameters of the abutting surface and the end surface of the back yoke is approximately equal to the outer diameter of the radial bearing member.

The diameter D1 at 0° C. of the outer peripheral surface of the rotating shaft which extends through the rotor-side bearing member and which faces the through-hole of the rotor-side bearing member and the diameter D2 of the surface of the rotor-side bearing member that defines the through-hole thereof at 0° C. substantially satisfy the following condition:

$$D1(1+\alpha 1 \cdot Tm) = D2(1+\alpha 2 \cdot Tm)$$

where $\alpha 1$ is the coefficient of linear expansion of the material of the rotating shaft; $\alpha 2$ is the coefficient of linear expansion of the material of the rotor-side bearing member; and $Tm°$ C. is a maximum temperature reached by the rotating shaft or the rotor-side bearing member during storage or operation thereof.

In addition, the present invention provides a drum motor for a VCR including a rotating shaft, a flange for mounting a rotor-side unit including a rotary drum and a recording head thereon, and a hydrodynamic bearing for rotatably supporting the rotating shaft. The hydrodynamic bearing includes radial and thrust hydrodynamic bearings composed of a rotor-side bearing member formed by bringing a pair of first and second thrust plates, at least the sliding portions of which are made of a ceramic material, into direct contact with both end surfaces, respectively, of a cylindrical radial bearing element at least a sliding portion of which is made of a ceramic material, and Integrating the first and second thrust plates and the radial bearing member into one unit, and a stator-side bearing member comprising a cylindrical radial sleeve, at least sliding portions of which are made of a ceramic material. The radial sleeve is disposed to face the rotor-side bearing member so that the inner peripheral surface and both end surfaces of the radial sleeve respectively cooperate with the outer peripheral surface of the radial bearing element and the mutually facing surfaces of the first and second thrust plates. The rotating shaft extends through a through-hole provided in the center of the rotor-side bearing member. The rotor-side bearing member is secured to the rotating shaft by a locking member provided on the rotating shaft. The drum motor further includes a rotor magnet of a motor part for driving the rotating shaft. The rotor magnet is secured to the rotating shaft. A motor casing is secured at the inner peripheral surface thereof to the outer peripheral surface of the radial sleeve. A stator unit is secured to the motor casing so as to face the rotor magnet of the motor part. Further, a dynamic pressure generating groove is provided on either each end surface of the radial sleeve, or each of the mutually facing surfaces of the first and second thrust plates.

The following arrangements should preferably be adopted in the second drum motor of this invention.

The rotating shaft has a stepped portion with an enlarged radius which is defined by a radially extended portion of the rotating shaft, and a pair of first and second abutting surfaces respectively defined by flat surfaces of the stepped portion which extend at right angles to the axial direction of the rotating shaft. One end surface of the first thrust plate is in direct contact with the first abutting surface. The rotor magnet is axially secured to a cylindrical back yoke made of a magnetic material. The rotating shaft extends through a through-hole provided in the center of the back yoke. The back yoke has a flat end surface extending at right angles to the through-hole of the back yoke. The end surface of the back yoke is in direct contact with one end surface of the second thrust plate. The rotor-side bearing member, the first and second thrust plates and the back yoke are axially pressed against the first abutting surface with a predetermined force by using a first locking member provided on the rotating shaft. The flange has a through-hole provided in the center thereof. The rotating shaft extends through the through-hole of the flange so that one end surface of the flange faces the end surface of the first thrust plate across the stepped portion and is brought into direct contact with the second abutting surface. The flange is axially pressed against the second abutting surface with a predetermined force by using a second locking member provided on the rotating shaft, thereby integrating the flange and the rotating shaft into one unit.

At least one of the outer diameters of the first and second abutting surfaces, the end surface of the back yoke and the end surface of the flange is approximately equal to the outer diameter of the radial bearing member.

The forces applied by the first and second locking members act in directions axially counter to each other and approximately equal to each other in magnitude.

The diameter D1 at 0° C. of the outer peripheral surface of the rotating shaft which extends through the rotor-side bearing member and which faces the through-hole of the rotor-side bearing member, the diameter D2 of the surface defining the of the rotor-side bearing member at 0° C., the diameter D3 at 0° C. of the outer peripheral surface of the rotating shaft which extends through the flange and which faces the through-hole provided in the center of the flange, and the diameter D4 of the surface defining the of the flange at 0° C. substantially satisfy at least one of the following two conditions:

$$D1(1+\alpha1\cdot Tm)=D2(1+\alpha2\cdot Tm)$$

and $$D3(1+\alpha1\cdot Tm)=D4(1+\alpha3\cdot Tm)$$

where $\alpha1$ is the coefficient of linear expansion of the material of the rotating shaft; $\alpha2$ is the coefficient of linear expansion of the material of the rotor-side bearing member: $\alpha3$ is the coefficient of linear expansion of the material of the flange; and Tm° C. is a maximum temperature reached by the rotating shaft or the rotor-side bearing member during storage or operation thereof.

The drum motor further includes means for effecting proper adjustment for a position in which the motor is installed, which includes preload generating means for previously magnetically generating a force counter to a thrust load attributable to the weight of the motor rotor and so forth in the range of from a level approximately half the thrust load to a level approximately equal to it.

The preload generating means includes a second magnet disposed so as to cooperate with the rotating shaft to form a magnetic circuit, thereby generating a force counter to the thrust load in the form of a magnetic force of the magnet.

At least the stepped portion of the rotating shaft is made of a magnetic material so that the stepped portion cooperates with the second magnet to form the magnetic circuit.

Alternatively, the motor part comprises a radial gap type magnetic circuit, and the preload generating means is formed previously generate a force counter to the thrust load by axially offsetting the magnetic center of the stator core of the motor part and the magnetic center of the rotor magnet from each other.

A dynamic pressure generating groove may be provided on either the outer peripheral surface off the radial bearing member or the inner peripheral surface of the radial sleeve.

A sliding portion of at least either of the radial and thrust bearing members is made of a ceramic material, e.g., silicon carbide or alumina.

In the hydrodynamic bearing employed in the drum motor for a VCR according to the present invention, the perpendicularity between the outer peripheral surface of the radial bearing member and each of the mutually facing surfaces of the thrust plates, which are in direct contact with both end surfaces of the radial bearing element, can readily be realized by accurately forming the thrust plates and the radial bearing member so that the thrust plates have the required flatness and the required perpendicularity is attained between each end surface of the radial bearing member and the outer peripheral surface thereof, and securing these members to the rotating shaft by using a locking member, e.g., a locking nut.

As to the radial bearing clearance, a predetermined clearance can be obtained by properly setting machining dimensions for the outer peripheral surface of the radial bearing element and the inner peripheral surface of the radial sleeve. As to the thrust bearing clearance, a predetermined clearance can readily be realized by ensuring the required height difference between the radial bearing element and the radial sleeve. Moreover, since ceramic parts, which are machinable with excellent accuracy in their single part state, are brought into direct contact with each other and integrated into one unit, excellent assembling accuracy can be obtained.

Since the radial bearing member and the two thrust plates, which are secured to the rotating shaft, each face the radial sleeve across a narrow clearance, these members are uniformly Pressed by sufficiently high dynamic pressures applied in the thrust and radial directions during rotation. Accordingly, the bearing structure has sufficiently high rigidity to satisfactorily endure an external force or the like irrespective of the position of the motor in which it is operated. Thus, the motor is capable of rotating with extremely high accuracy and with minimal vibration.

In addition, even if air is employed as a fluid for the hydrodynamic bearings, bearing rigidity sufficient for a practical application can be obtained. In comparison to hydrodynamic bearings which employ oil as a fluid, the hydrodynamic bearings of the present invention have advantages in that the load bearing capacity, bearing torque and other performance of the bearings show an extremely small change with respect to a change in temperature, and that there is no possibility of the working fluid drying up, and further that no peripheral parts will be contaminated.

In one embodiment of the present invention, the bearing rigidity is 2,300 gf/μm in the thrust direction and 2,200 gf/μm in the radial direction. The bearing rigidity in the thrust direction is set relative to that in the radial direction in accordance with the purpose of use. For example, when the weight of the rotor is about 400 g, if the motor is used in a position where the rotating shaft extends vertically upward, the thrust load is about 400 gf, whereas, when the motor is used in a position where the rotating shaft extends horizontally, the thrust load is zero. Accordingly, the change of the thrust load due to a change of the position of the rotating shaft is 400 gf at maximum.

The displacement of the rotating shaft in the thrust direction at the time of change of the position of the rotating shaft or attitude of the hydrodynamic bearings is determined by the bearing rigidity in the thrust direction. In the embodiment of the present invention, it is about 0.17 μm. When the motor is used in an inverted position, that is, when the rotating shaft extends vertically downward, the displacement of the rotating shaft is also about 0.17 μm with respect to the position of the rotating shaft when extending horizontally. Therefore, the motor of the present invention can be used in an inverted position without any practical problem. Thus, the present invention minimizes a change of the relative height of the rotating shaft with respect to a change in the operating position of the motor, which is particularly important. Particularly excellent effects can be expected when the bearing structure of the present Invention is used for a drum motor for a VCR.

It has been experimentally confirmed that the run-out of the rotating shaft in the embodiment of the present invention is about 1/10 to about 1/20 of that in the conventional drum motor employing ball bearings in both the radial and thrust directions in the rotational speed range of from 1,800 rpm to 5,000 rpm, which is the service rotational speed range of drum motors.

The members which are to be locked are clamped by applying a predetermined level of force with a locking member, e.g., a locking nut, through a frustoconical disc spring or other similar spring. Further, the outer diameters of the respective abutting surfaces of the members to be locked are made equal to each other so that the clamping stress is leveled out. Thus, the deformation of the rotor-side bearing member after the assembly is minimized, and the air film in the dynamic pressure generating part is thin and uniform. Accordingly, a bearing structure having high bearing rigidity is obtained.

In addition, the clearance between the rotating shaft and the through-hole in the rotor-side bearing member where the rotating shaft extends and is secured is set so as to be approximately zero at the maximum service temperature of the motor. That is, a clearance fit is employed (the coefficient of linear expansion of the shaft is greater than that of the bearing member). Accordingly, the radial displacement of the rotor-side bearing member relative to the rotating shaft, which is caused by a difference in the coefficient of linear expansion between the materials of the two members, occurs reversibly and coaxially with respect to the rotating shaft by virtue of fact that the clearance fit between the rotating shaft and the through-hole is minimized in combination with the fact that the clamping stress imposed on the abutting surfaces is leveled out, as described above. Thus, any change in the run-out of the rotating shaft due to a temperature change is extremely small. Further, in a case where the rotor-side bearing member is made of a brittle material, e.g., a ceramic material, it is possible to prevent damage to the rotor-side bearing member.

The manner in which the rotating shaft fits the through-hole in the flange, where the rotating shaft extends and is secured, is specified as being an interference fit (the coefficient of linear expansion of the flange is greater than that of the shaft) so that the clearance is approximately zero at the maximum service temperature of the motor. Accordingly, it is possible to minimize displacement of the flange relative to the rotating shaft and deformation thereof due to a temperature change. Thus, it is possible to maintain a stable performance, attended with minimal run-out, over the entire range of temperatures at which the motor is used.

In addition, the apparent thrust load can be made approximately zero by magnetically generating a force counter to the thrust load attributable to the weight of the rotor. Thus, the torque loss in the thrust bearing at the time of starting can be made approximately zero. Moreover, the sliding portions are formed by using a ceramic material, e.g., silicon carbide or alumina, which exhibits excellent wear resistance and slip properties. Accordingly, it is possible to save electric power at the time of starting and to eliminate damage to the thrust bearing members which might otherwise occur when the motor is started and stopped. Thus, the durability also improves by a large margin in comparison to the prior art.

It is often conventional in hydrodynamic bearings that the sliding surfaces are finished super-flat in order to improve the sliding characteristics thereof. However, it is known that if the super-flat surfaces of thrust bearing members slide on each other with a high surface pressure being applied thereto, the mutually facing surfaces of the sliding portions adhere to each other, resulting in a failure to start rotation. However, such a problem is also eliminated. That is, the adhesion of the bearing portions can be prevented by maintaining the thrust load at approximately zero, as described above.

In a case where a thin lubricating film, for example, is formed on the sliding surfaces in order to obtain even more excellent sliding characteristics, it is also possible to prevent the occurrence of such phenomenon as adhesion caused by the thin lubricating film by maintaining the thrust load at approximately zero in the same way as described above. Thus, it is possible to use the effectiveness of the thin lubricating film to the fullest extent and to provide a bearing of high performance and high reliability.

The above and other objects, features and advantages of the present invention will become more apparent from the following description when taken in conjunction with the accompanying drawings in which preferred embodiments of the present invention are shown.

PREFERRED EMBODIMENT OF THE INVENTION

Figure 1:
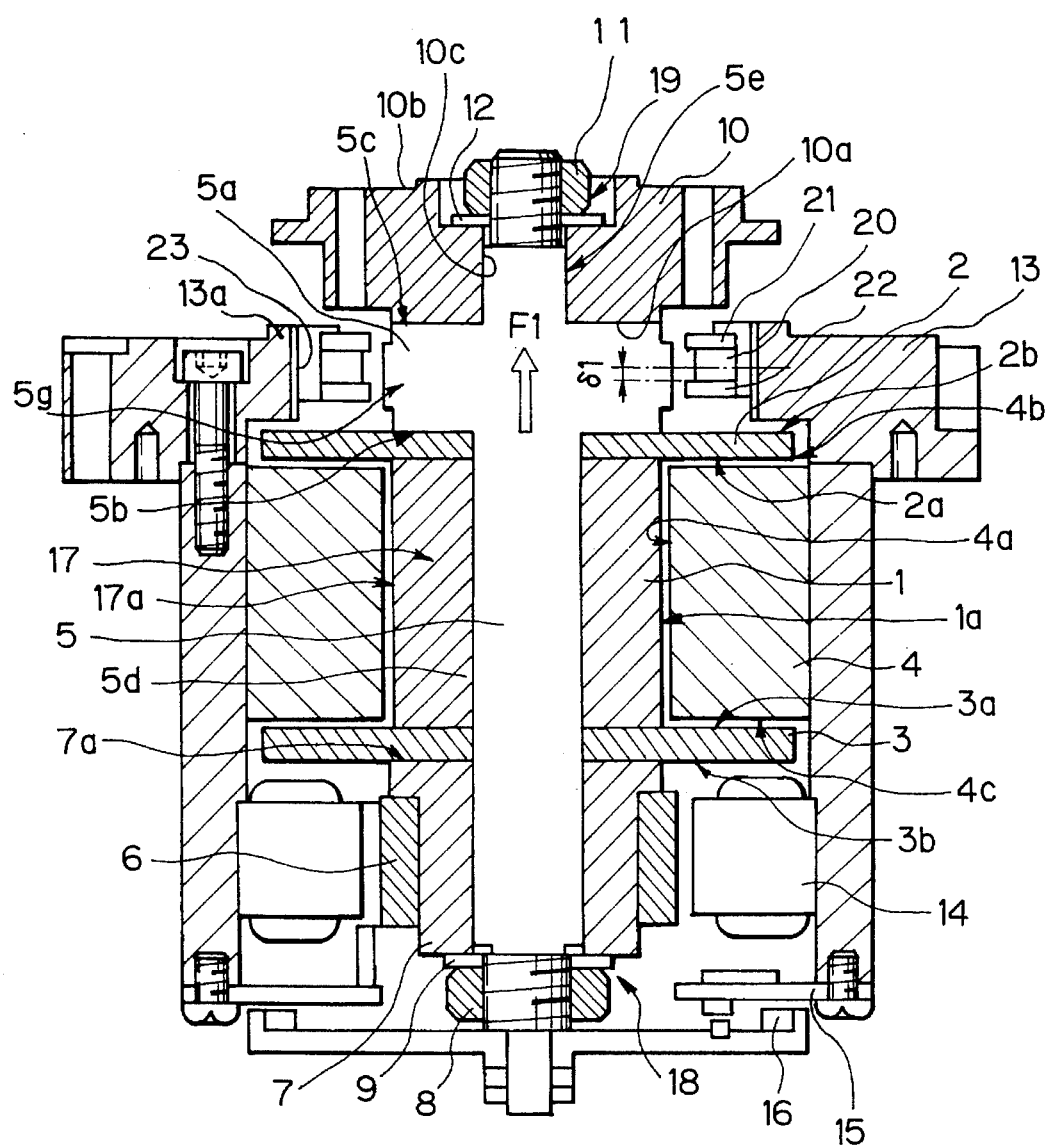
FIG. 1 is a sectional view of the drum motor for a VCR according to the present invention.

Embodiments of the present invention will be described below with reference to the accompanying drawings. FIG. 1 is a sectional view of the drum motor for a VCR according to the present invention. Referring to FIG. 1, a cylindrical radial bearing element 1 is made of a ceramic material. A pair of first and second thrust plates 2 and 3, which are made of a ceramic material, are in direct contact with both end surfaces, respectively, of the radial bearing element 1. A cylindrical radial sleeve 4 is made of a ceramic material. The radial sleeve 4 is supported at its inner peripheral surface 4a and end surfaces 4b and 4c by the outer peripheral surface 1a of the radial bearing element 1 and the mutually facing surfaces 2a and 3a of the first and second thrust plates 2 and 3, respectively, so that the radial bearing element 1 is rotatably supported by the radial sleeve 4. The outer peripheral surface 1a of the radial bearing element 1 and the inner peripheral surface 4a of the radial sleeve 4 constitute in combination a radial hydrodynamic bearing, while the mutually facing surfaces 2a and 3a of the first and second thrust plates 2 and 3 constitute a thrust hydrodynamic bearing in combination with the two end surfaces 4b and 4c of the radial sleeve 4.

A rotating shaft 5 extends through a through-hole provided in the rotor-side bearing member 17, which is formed by bringing the first and second thrust plates 2 and 3 into contact with both end surfaces of the cylindrical radial bearing element 1 and integrating them into one unit. The rotating shaft 5 has a stepped portion 5a with an enlarged radius which is defined by a radially extended portion of the rotating shaft 5, and a first abutting surface 5b defined by a flat surface of the stepped portion 5a which extends at right angles to the axial direction. One end surface 2b of the first thrust plate 2 is in direct contact with the first abutting surface 5b.

A rotor magnet 6 of a motor part for driving the rotating shaft 5 is coaxially secured to a cylindrical back yoke 7 made of a magnetic material. The rotating shaft 5 extends through a through-hole provided in the center of the back yoke 7. One end surface 7a of the, back yoke 7 is in direct contact with one end surface 3b of the second thrust plate 3.

The rotor-side bearing member 17 and the back yoke 7 are integrated into one unit by pressing them with a predetermined pressure by using a locking nut 8 which is provided on the lower end of the rotating shaft 5. It should be noted that a frustoconical disc spring 9 is interposed between the locking nut 8 and the back yoke 7.

A flange 10 for mounting a rotor-side unit comprising a rotary drum and a recording head receives the rotating shaft 5 extending through a through-hole provided in the center thereof. One end surface 10a of the flange 10 is in direct contact with a second abutting surface 5c provided on the stepped portion 5a. The flange 10 and the rotating shaft 5 are integrated into one unit by pressing them with a predetermined pressure by using a locking nut 11 which is provided on the upper end of the rotating shaft 5. It should be noted that a frustoconical disc spring 12 is interposed between the locking nut 11 and the flange 10. Further, a motor casing 13 is secured to the outer peripheral surface of the radial sleeve 4, and a stator unit 14 is secured to the inner peripheral surface of the motor casing 13 in an opposing relation to the rotor magnet 6.

It should be noted that reference numeral 15 denotes a Hall element substrate for detecting the radial position of the rotor magnet 6, and reference numeral 16 denotes a ring-shaped FG magnet which is disposed so as to cooperate with a comb-like coil printed on the Hall element substrate 15 to constitute a frequency generator for detecting the axial position of the rotor side unit.

Figure 2:
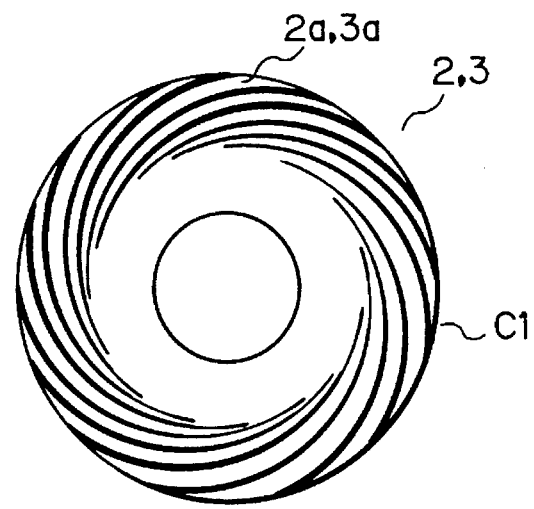
FIG. 2 shows a spiral groove for generating dynamic pressure which may be provided in thrust plates of the drum motor for a VCR according to the present invention.
Figure 3:
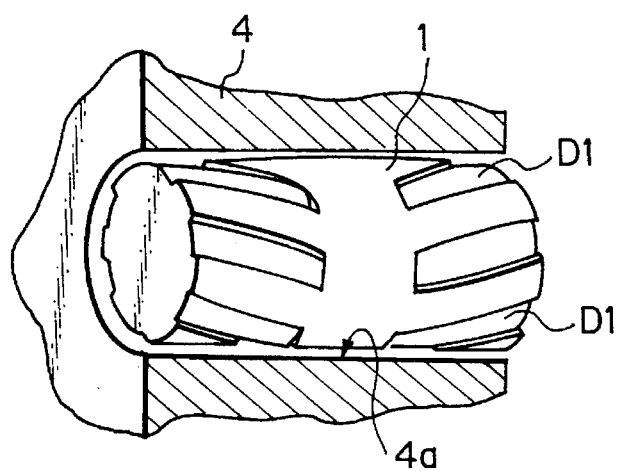
FIG. 3 shows herringbone-shaped grooves for generating dynamic pressure which may be provided in a radial bearing member of the drum motor for a VCR according to the present invention.

The mutually facing surfaces 2a and 3a of the first and second thrust plates 2 and 3, which are rotating members of the thrust hydrodynamic bearing, are provided with respective dynamic pressure generating grooves, e.g., spiral dynamic pressure generating grooves C1 as shown in FIG. 2. On the other hand, the two end surfaces 4b and 4c of the radial sleeve 4, which is a stationary member of the thrust hydrodynamic bearing, are smooth. Further, both end portions of the outer peripheral surface 1a of the radial bearing element 1, which is a rotating member of the radial hydrodynamic bearing, are provided with dynamic pressure generating grooves, e.g., herringbone-shaped dynamic pressure generating grooves D1 as shown in FIG. 3. On the other hand, the inner peripheral surface 4a of the radial sleeve 4, which is a stationary member of the radial hydrodynamic bearing, is smooth.

It should be noted that members which are provided with such dynamic pressure generating grooves are not limited to the rotating members. The arrangement may be such that spiral dynamic pressure generating grooves are provided on the two end surfaces 4b and 4c of the radial sleeve 4, which is a stationary member, and herringbone-shaped dynamic pressure generating grooves are provided on the inner peripheral surface 4a of the radial sleeve 4, whereas the mutually facing surfaces 2a and 3a of the first and second thrust plates 2 and 3, which are rotating members, together with the outer peripheral surface 1a of the radial bearing element 1 (which is also a rotating member), are smoothed.

Incidentally, the radial hydrodynamic bearing used in the drum motor for a VCR may be provided with no radial dynamic pressure generating groove. That is, the rotational speed of a drum motor for a VCR is of the order of 1,800 rpm to 3,600 rpm. In such a rotational speed range, which is relatively low for hydrodynamic bearings, there is substantially no difference in bearing rigidity between cylindrical bearings having no radial dynamic pressure generating grooves and bearings provided with radial dynamic pressure generating grooves. There are cases where the bearing rigidity of cylindrical bearings is significantly higher than that of bearings provided with radial dynamic pressure generating grooves under certain conditions.

In the drum motor for a VCR having the above-described structure, the perpendicularity between the outer peripheral surface 1a of the radial bearing element 1 and the mutually facing surfaces 2a and 3a of the first and second thrust plates 2 and 3 after these members have been assembled together to constitute a hydrodynamic bearing is important for uniformly forming a thin air film on each dynamic pressure generating surface and also for enhancing the bearing rigidity. In this regard, if the first and second thrust plates 2 and 3 and the radial bearing element 1 are formed so that the thrust plates 2 and 3 have the required flatness and the required perpendicularity is obtained between each end surface of the radial bearing element 1 and the outer peripheral surface thereof in their single part state, the required accuracy can be reproduced even after they have been assembled together, by clamping these members with the locking nut 8. That is, it is possible to obtain a remarkably high degree of assembling accuracy by bringing ceramic members, which can be machined with excellent accuracy in their single part state, into direct contact with each other without interposition and integrating them into one unit. Accordingly, it is possible to readily realize a hydrodynamic bearing having high bearing rigidity, in which a narrow clearance is uniformly ensured.

Further, the end surface 2b of the first thrust plate 2 is brought into direct contact with the first abutting surface 5b, while the end surface 7a of the back yoke 7 is brought into direct contact with the end surface 3b of the second thrust plate 3, and a spring 9, for example, a frustoconical disc spring or a coil spring, having an appropriate spring constant is interposed between the locking nut 8 and the back yoke 7. Then, the locking nut 8 is tightened within the elastically deformable range of the spring 9. Consequently, the rotor-side bearing member 17 is uniformly pressed in the axial direction by a predetermined pressure. Thus, the rotor-side bearing member 17 can be secured to the rotating shaft 5 without applying an excessive force thereto. That is, the rotor-side bearing member 17 is secured to the rotating shaft 5 by applying a force which is sufficient to secure the thrust plates 2 and 3 and the radial bearing element 1 to the rotating shaft 5, and yet which minimizes the deformation off the rotor-side bearing member 17 due to the clamping stress.

Further, the stress, which would cause the rotor-side bearing member 17 to be deformed even after the assembly, is effectively relieved by properly controlling the perpendicularity of the first abutting surface 5b with respect to the center hole of the rotor-side bearing member 17 and the perpendicularity of the end surface 7a of the back yoke 7 with respect to the center hole of the back yoke 7. Thus, the constituent elements can be assembled together without lowering the machining accuracy of these elements in their single part state.

Figure 4:
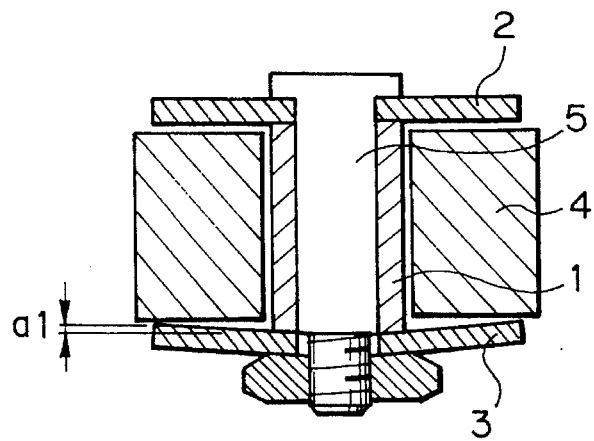
FIG. 4 illustrates warpage of a thrust plate after the assembly of a conventional hydrodynamic bearing.

The outer diameter of the first abutting surface 5b and that of the end surface 7a of the back yoke 7 are made approximately equal to the outer diameter of the radial bearing element 1. By doing so, the abutting surfaces of the thrust plates 2 and 3 are axially pressed by uniform force over the entire area of each abutting surface even after the clamping process. Accordingly, it is possible to minimize warpage or other deformation of the thrust plates 2 and 3 due to the clamping stress. In this embodiment, the warpage a1 of the thrust plates 2 and 3 after assembly is not more than 0.2 μm, whereas in the conventional bearing structure it has been 1 μm or more, as shown in FIG. 4.

When the flange 10 is to be secured to the rotating shaft 5, the flange end surface 10a is brought into direct contact with the second abutting surface 5c, and a spring 12, e.g., a frustoconical disc spring or a coil spring, having an appropriate spring constant, is interposed between the locking nut 11 and the flange 10. Then, the locking nut 11 is tightened within the elastically deformable range of the spring 12 in the same way as the above. By doing so, the second abutting surface 5c is uniformly pressed in the axial direction by a predetermined pressure, thereby enabling the flange 10 to be secured to the rotating shaft 5 in such a manner that the deformation of the stepped portion 5a and the rotor-side bearing member 17 due to the clamping stress is minimized.

Further, the outer diameter of the second abutting surface 5c and that of the end surface 10a of the flange 10 are made approximately equal to each other. Thus, the abutting end surface 10a of the flange 10 is axially pressed uniformly over the entire area thereof even after the clamping process. Accordingly, it is possible to reduce the change of the rotor-side unit mounting surface 10b of the flange 10 with time due to the clamping stress. It is also possible to further minimize the deformation of the stepped portion 5a and the rotor-side bearing member 17.

Further, the clamping force applied by the first locking member (the locking nut 8 and the frustoconical disc spring 9) and the clamping force by the second locking member 19 (the locking nut 11 and the frustoconical disc spring 12) are made approximately equal to each other so that the surface pressures applied to the first and second abutting surfaces 5b and 5c are equal to each other. Thus, the deformation of the stepped portion 5a due to uneven clamping stress is reduced, and the deformation of the rotor-side bearing member 17 due to uneven clamping stress is also reduced. Further, it is possible to shorten the axial length of the stepped portion 5a and hence possible to reduce the overall size of the motor. In addition, it is possible to further reduce the clearance in the dynamic pressure generating part, which determines the bearing rigidity. Accordingly, a hydrodynamic bearing having high bearing rigidity and capable of being mass-produced can readily be realized.

In addition, tile diameter of the outer peripheral surface 5d of the rotating shaft 5 and the diameter of the through-hole of the rotor-side bearing member 17 are set so as to satisfy substantially the following condition:

$$D1(1+\alpha1 \cdot Tm) = D2(1+\alpha2 \cdot Tm)$$

where D1 is the diameter of the outer peripheral surface 5d of the rotating shaft 5 at the temperature of 0° C.; α1 is the coefficient of linear expansion of the material of the rotating shaft 5; D2 is the diameter of the through-hole 17a of the rotor-side bearing member 17 at 0° C.; α2 is the coefficient of linear expansion of the material of the rotor-side bearing member 17; and Tm° C. is the maximum temperature reached by the rotating shaft 5 or the rotor-side bearing member 17 during storage or operation thereof.

By setting the diameters D1 and D2 as described above, a minimum clearance is constantly held between the rotating shaft 5 and the through-hole 17a of the rotor-side bearing member 17 over the entire range of temperatures at which the motor is used, and the rotor-side bearing member 17 is readily fixed in coaxial relation to the rotating shaft 5.

Further, the abutting surfaces of the thrust plates 2 and 3 are axially pressed by a uniform force over the entire area of each abutting surface, as described above. Thus, the radial displacement of the rotor-side bearing member 17 relative to the rotating shaft 5, which is caused by a difference in the coefficient of linear expansion between the materials of the two members, occurs reversibly and coaxially with respect to the rotating shaft 5. Thus, it is possible to minimize the change of run-out of the rotating shaft 5 due to a change in temperature.

In a case where the rotor-side bearing member 17 is formed by using a brittle material, e.g., a ceramic material, it is also possible to prevent damage to the rotor-side bearing member 17 caused by a difference in the coefficient of linear expansion between the materials of the two members. In addition, the diameter of the outer peripheral surface $5d$ of the rotating shaft 5 and the diameter of the through-hole $10c$ of the flange 10 are set so as to satisfy substantially the following condition:

$$D3(1+\alpha 1 \cdot Tm) = D4(1+\alpha 3 \cdot Tm)$$

where D3 is the diameter of the outer peripheral surface $5d$ of the rotating shaft 5 at 0° C.; $\alpha 1$ is the coefficient of linear expansion of the material of the rotating shaft 5; D4 is the diameter of the through-hole $10c$ of the flange 10 at 0° C.; $\alpha 3$ is the coefficient of linear expansion of the material of the flange 10; and Tm° C. is the maximum temperature reached by the rotating shaft 5 or the flange 10 during storage or operation thereof.

By setting the diameters D3 and D4 as described above, a minimum interference is created between the outer peripheral surface of the rotating shaft 5 and the through-hole $10c$ of the flange 10 over the entire range of temperatures at which the motor is used, and the flange 10 is fixed in coaxial relation to the rotating shaft 5 at all times. Further, the abutting surface of the flange 10 is axially pressed by a uniform force over the entire area thereof, as described above. Thus, the deformation of the flange 10, which is caused by a difference in the coefficients of linear expansion between the materials of the two members, occurs reversibly and coaxially with respect to the rotating shaft 5. Thus, it is possible to minimize the change of run-out of the flange 10 due to a change in temperature.

On the top of the motor casing 13 are provided a ring-shaped second magnet 20 and two yoke plates 21 and 22. The yoke plates 21 and 22 are coaxially secured to a cylindrical sleeve 23, made of a non-magnetic material, so as to abut the second magnet 20. The outer periphery of the sleeve 23 is provided with a thread, which is in engagement with a thread provided on the inner peripheral surface $13a$ of the top of the motor casing 13. Thus, the sleeve 23 is axially movably secured to the motor casing 13.

The second magnet 20 has been magnetized, for example, SN, in the direction of the axis (thickness) thereof to form a magnetic circuit through the two yoke plates 21 and 22 and the outer peripheral surface $5g$ of the stepped portion $5a$ of the rotating shaft 5. The flange 10 is made of a non-magnetic material, e.g., aluminum, and it is not involved in forming the magnetic circuit. The center of the two yoke plates 21 and 22 and the center of the stepped portion $5a$ are axially offset from each other by $\delta 1$, thereby axially generating a magnetic attraction force (preload) F1 counter to the thrust load.

Figure 5:
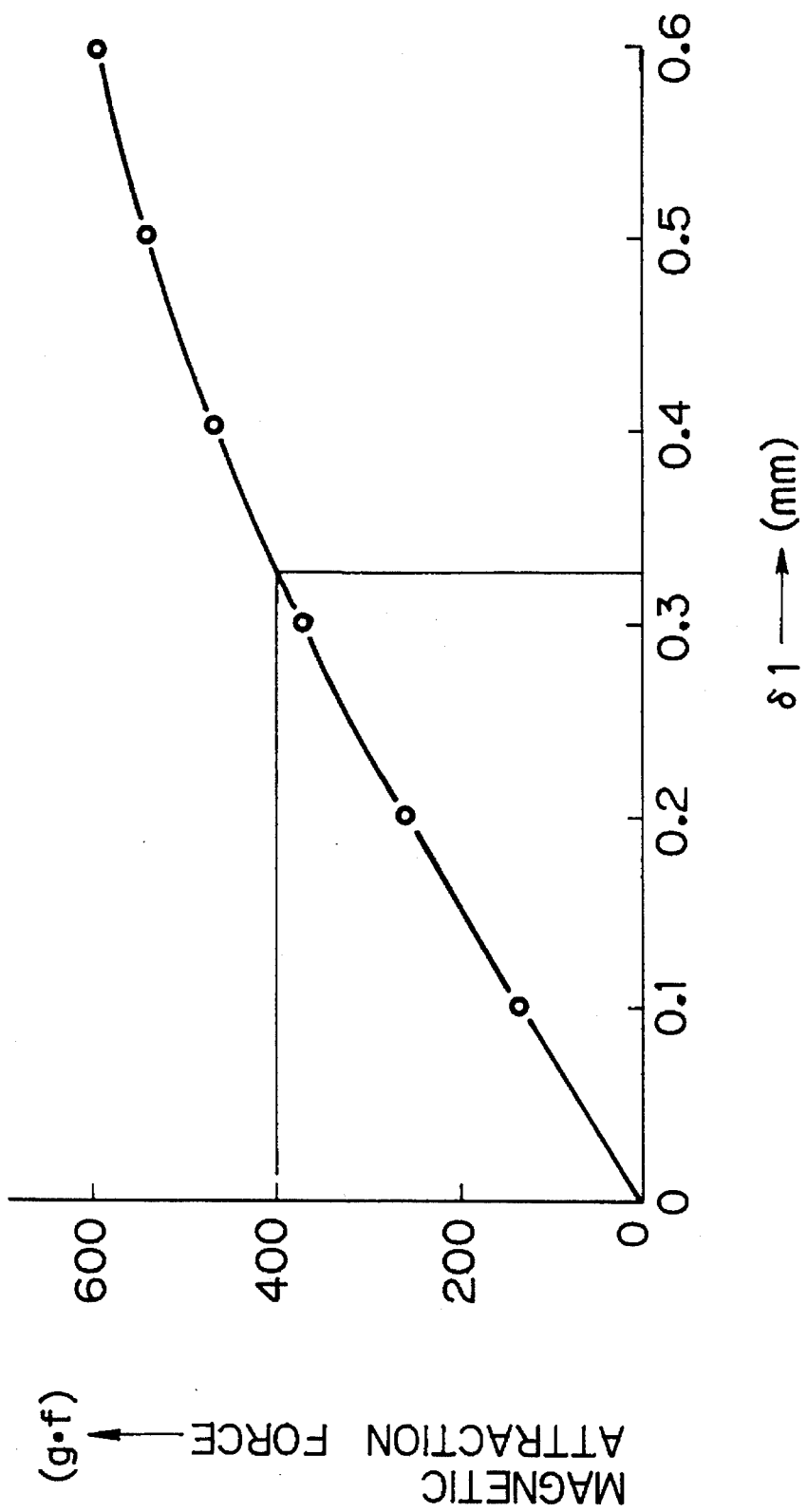
FIG. 5 is a graph showing the relationship between the magnetic attraction force and the axial offset between the center of yoke plates and the center of a stepped portion in an embodiment of the present invention.

The relationship between $\delta 1$ and the attraction force is shown in FIG. 5. By properly setting $\delta 1$, the attraction force F1 can be adjusted in the range of from approximately ½ of the thrust load to a level approximately equal to the thrust load.

Figure 6:
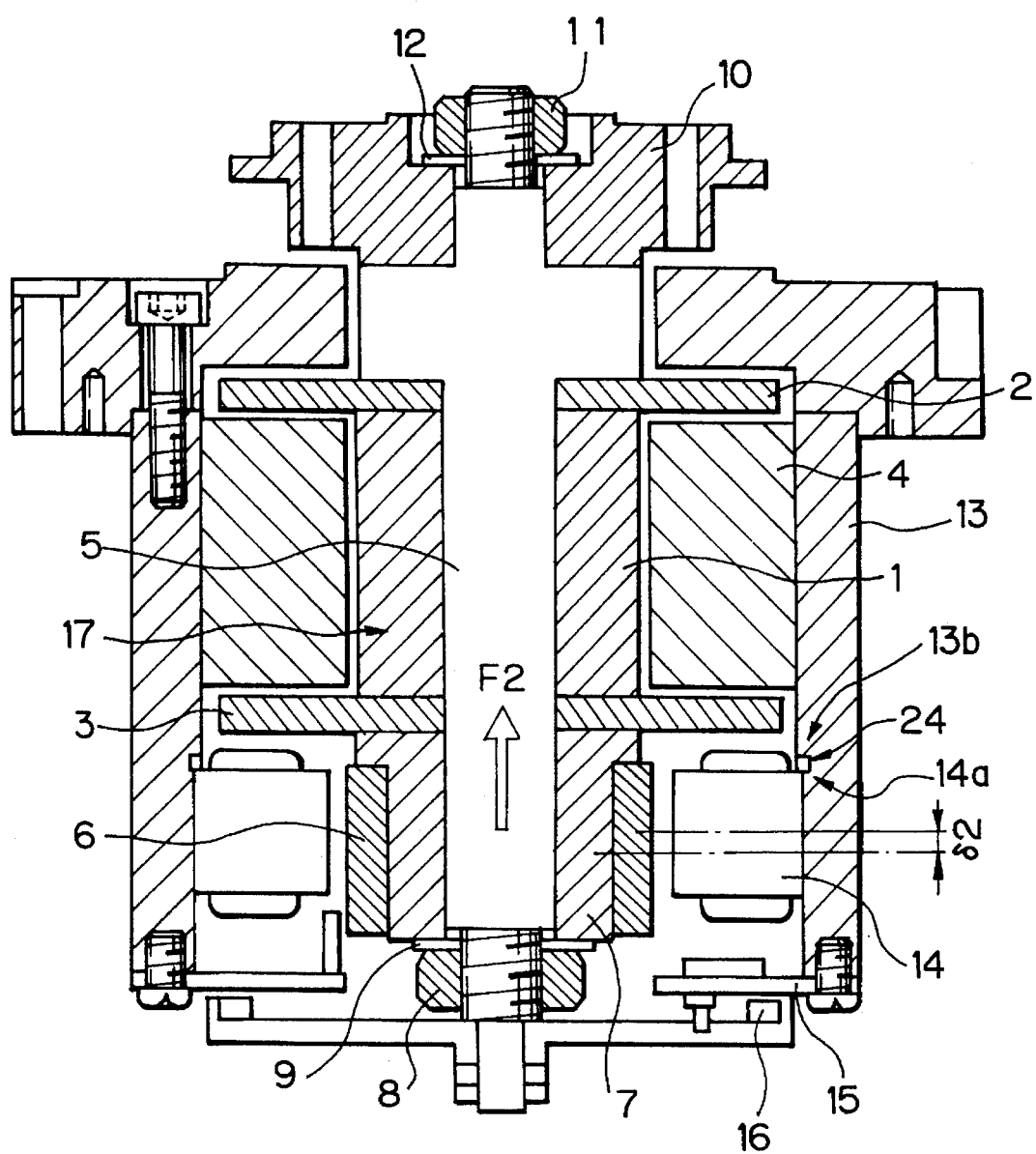
FIG. 6 is a sectional view another structure of drum motor for a VCR according to the present invention.

To obtain the same advantageous effect as described above, the drum motor may be arranged as shown in FIG. 6. That is, the magnetic center of the stator core of the stator unit 14 and the magnetic center of the rotor magnet 6 are axially offset from each other by $\delta 2$, thereby generating an axial attraction force F2. In this case, the attraction force F2 can be set to an appropriate value through adjustment of $\delta 2$ by changing the axial thickness of a ring-shaped shim 24 inserted inbetween the end portion $14a$ of the stator core of the stator unit 14 and the abutting surface $13b$ of the motor casing 13.

It should be noted that in a case where the drum motor is used only in a state where the rotating shaft 5 extends vertically upward, it is preferable to nullify the apparent thrust load by making the preload approximately equal to the thrust load. In a case where the motor is used in two different positions, i.e., one in which the rotating shaft 5 extends vertically upward, and the other in which it extends horizontally, the preload may be set at a level approximately half the weight of the rotor. In this case, when the rotating shaft 5 extends vertically upward, the thrust load applied to the sliding surfaces on the first thrust plate side is approximately half the weight of the rotor, whereas, when the rotating shaft 5 extends horizontally, the thrust load applied to the sliding surfaces on the second thrust plate side is approximately half the weight of the rotor.

By reducing the thrust load by the application of a preload as described above, it is possible to minimize the starting torque and prevent adhesion. In addition, it is possible to minimize the wear on the sliding surfaces due to repetition of start and stop and hence, it is possible to realize a bearing having excellent durability and high reliability.

Although in the foregoing embodiment the first and second thrust plates 2 and 3, the radial bearing element 1 and the radial sleeve 4 are all made of a ceramic material, it should be noted that each of these members is not necessarily limited to being entirely made of a ceramic material, and that only sliding portions of these members may be formed from a ceramic material according to circumstances.

Figure 7:
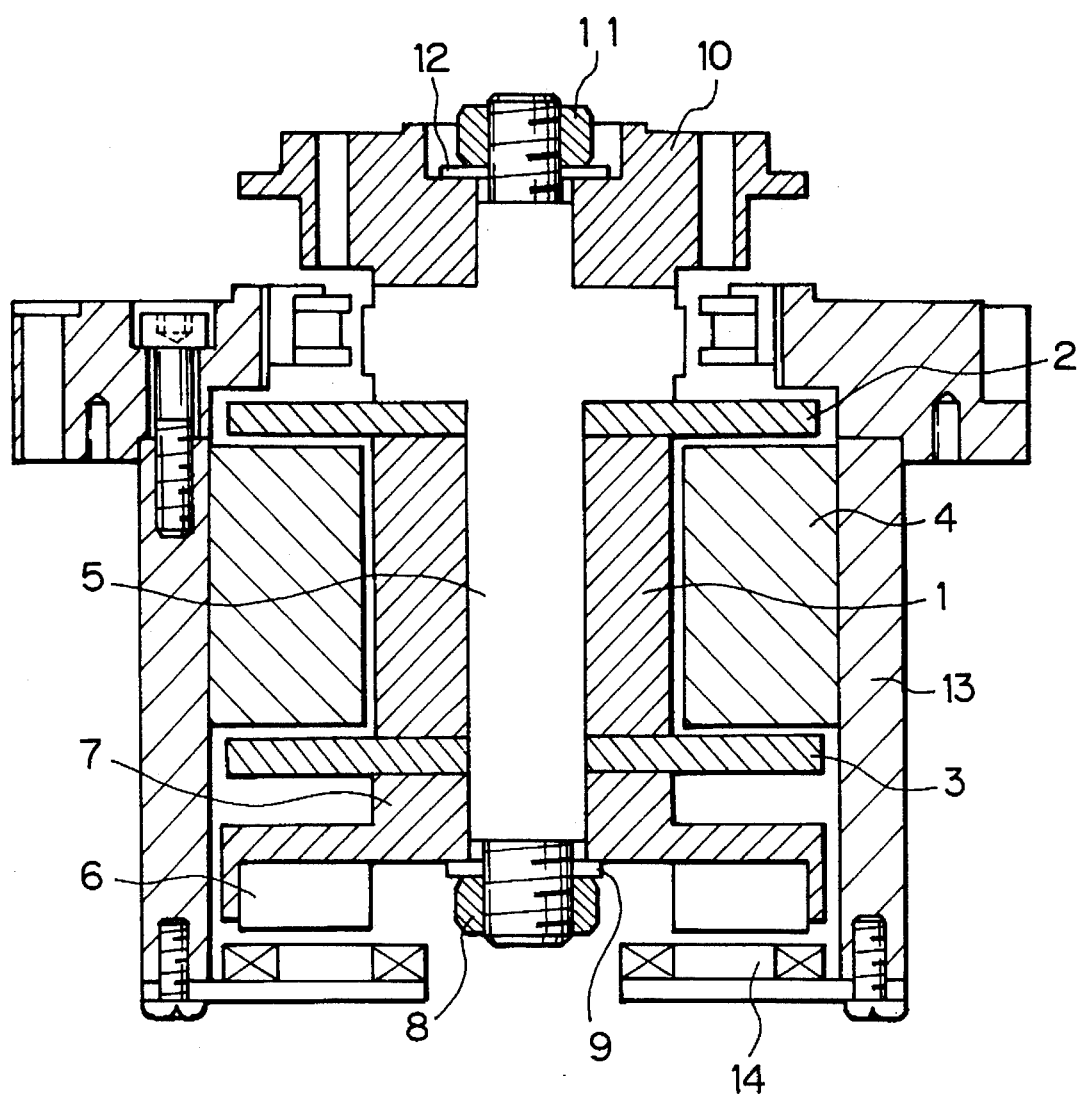
FIG. 7 is a sectional view of still another drum motor for a VCR according to the present invention.

Although in the foregoing embodiment the present invention is applied to a radial gap type of motor, it should be noted that the present invention is not necessarily limited to the radial gap type of motor but may also be applied to an axial gap type of motor such as that shown in FIG. 7. That is, the motor structure may be such that a rotor magnet 6 is secured to the lower end surface of a back yoke 7, and a stator unit 14 is provided so as to face the rotor magnet 6 across a gap in the axial direction of the rotating shaft 5. In this case, the thrust load additionally includes the attraction force of the rotor magnet 6 acting in the thrust direction.

Figure 8:
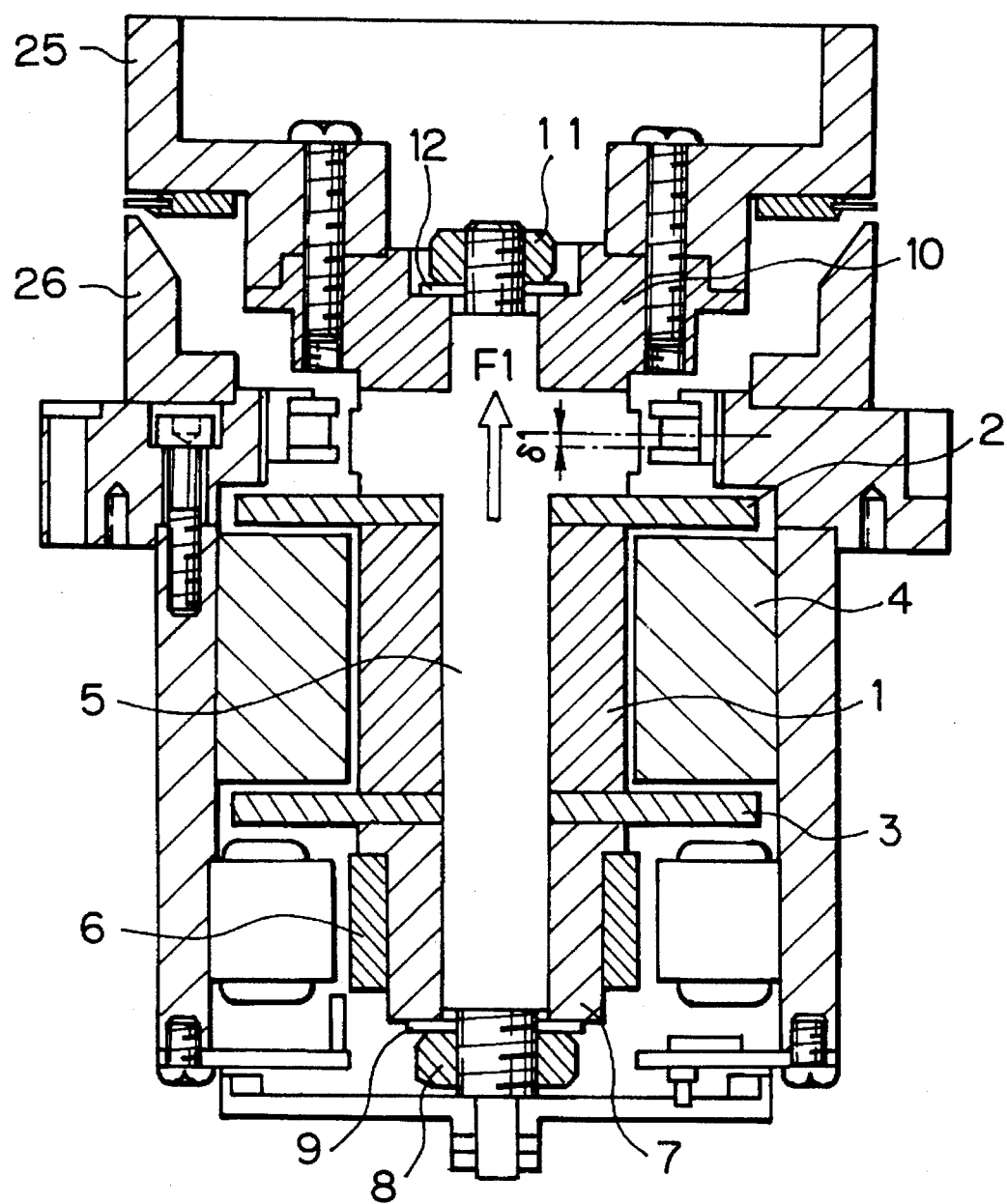
FIG. 8 is a sectional view of the drum motor for a VCR according to the present invention, which is equipped with a rotor-side unit and a stator-side unit.
Figure 9:
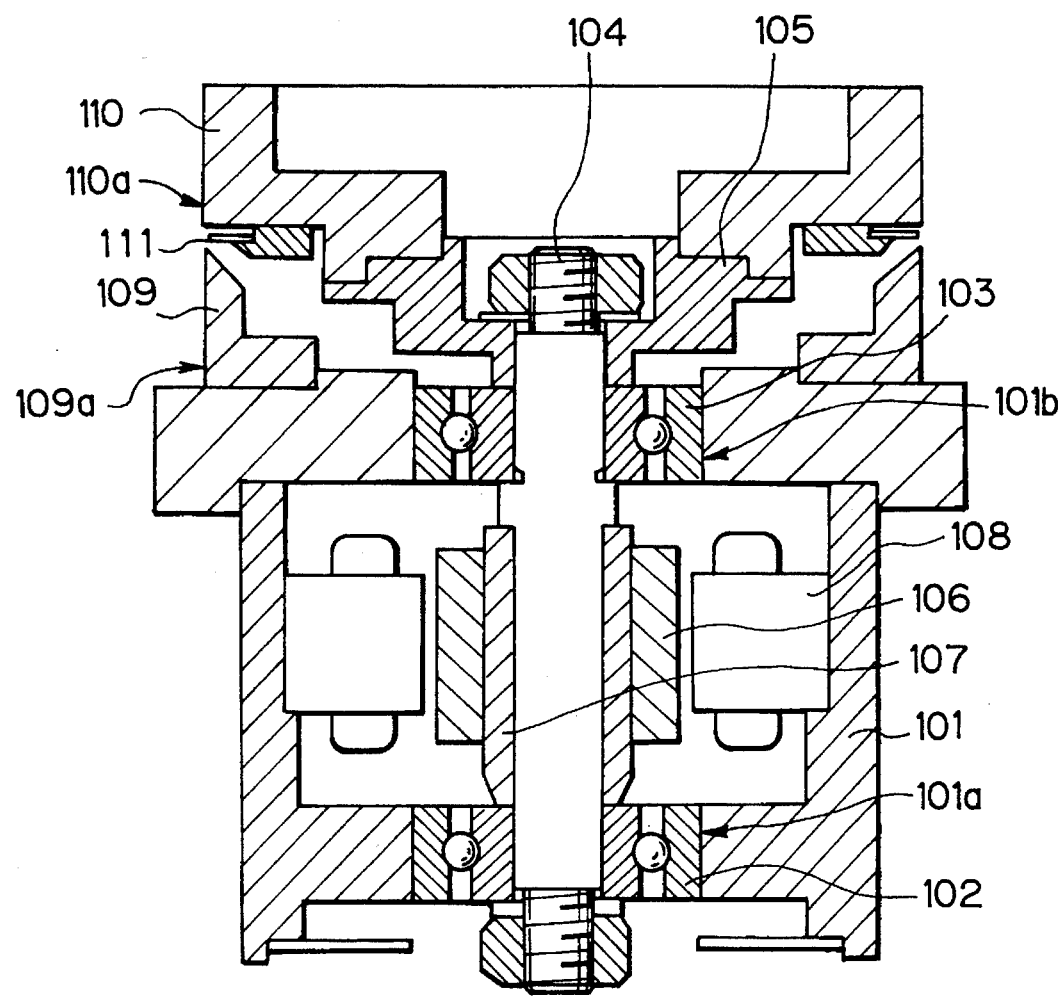
FIG. 9 is a sectional view of a conventional drum motor for a VCR which employs ball bearings.
Figure 10:
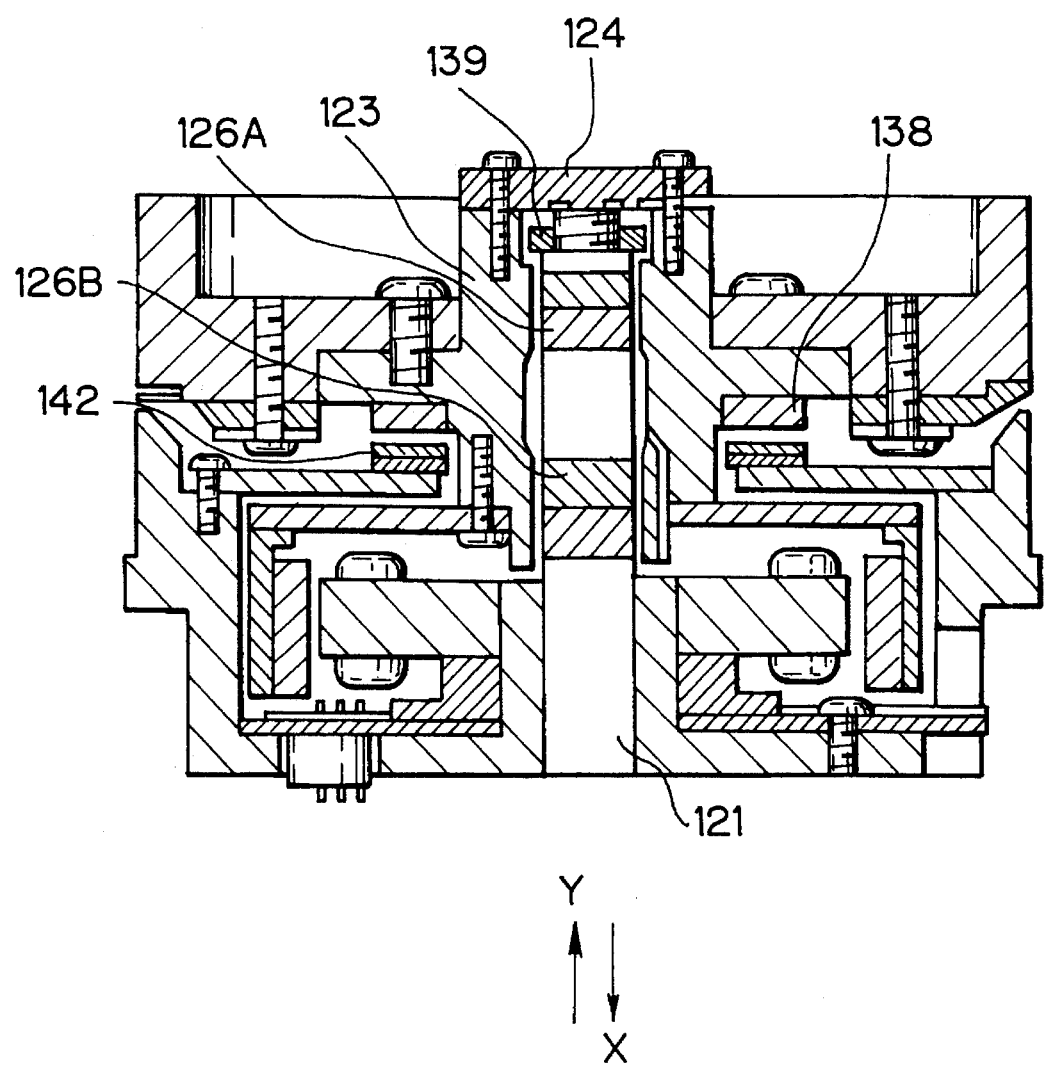
FIG. 10 is a sectional view of a conventional drum motor for a VCR which employs hydrodynamic bearings.
Figure 11:
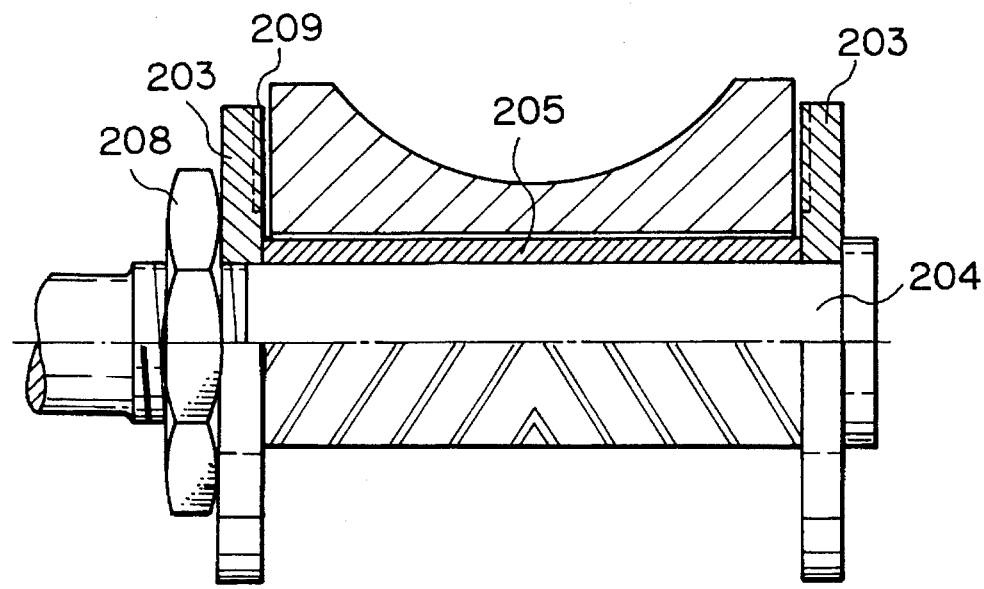
FIG. 11 is a sectional view of the H-shaped bearing structure of a conventional hydrodynamic bearing.
Figure 12:
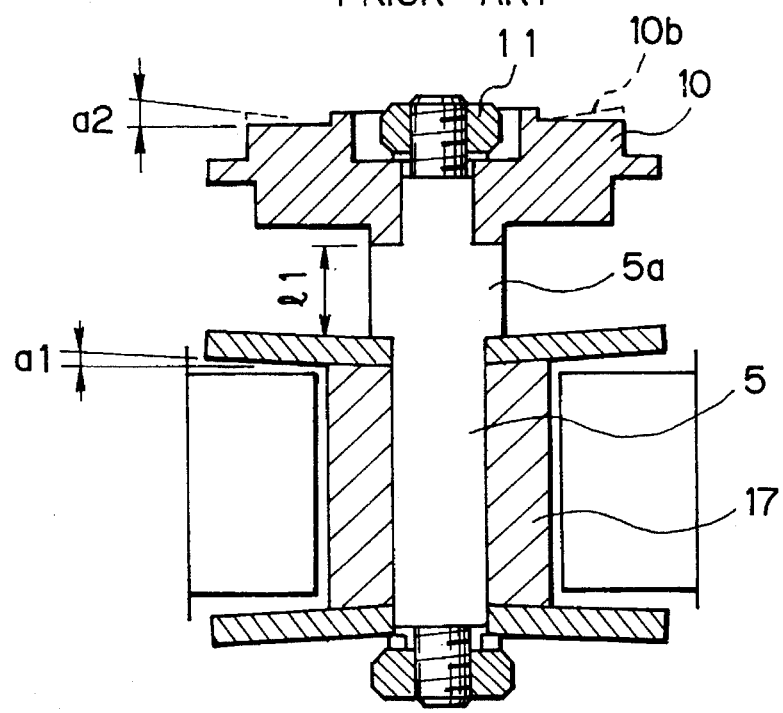
FIG. 12 illustrates warpage of thrust plates after the assembly of a bearing in a conventional drum motor for a VCR.

FIG. 8 shows the drum motor for a VCR having the structure shown in FIG. 1, which is equipped with a rotor-side unit 25 and a stator-side unit 26.

As has been described above, the present invention provides the following excellent effects:

(1) The perpendicularity required for the sliding surface of the radial hydrodynamic bearing and the sliding surface of the thrust hydrodynamic bearing can be obtained with high accuracy, and narrow clearances can be ensured for the radial and thrust hydrodynamic bearings. Thus, even in a hydrodynamic bearing that uses air as a fluid, high bearing rigidity can be obtained.

(2) The rotor-side bearing member is clamped by a predetermined level of force uniformly over the entire area of the abutting surfaces thereof over the entire range of temperatures at which the motor is used. By properly setting the clearance between the rotating shaft and the rotor-side bearing member, it is possible to minimize the deformation of the rotor-side bearing member due to a temperature change. Accordingly, the thickness of the air film established in the dynamic pressure generating part can be thin and uniform. Thus, it is possible to provide a bearing structure which exhibits high bearing rigidity and stable rotational accuracy even in a relatively low service rotational speed range as in the case of a drum motor for a VCR.

(3) Since the radial bearing element and the two thrust plates, which are secured to the rotating shaft, face the radial sleeve across narrow clearances, these members are uniformly Pressed during rotation by sufficiently high dynamic pressures in the thrust and radial directions. Therefore, the bearing structure has sufficiently high rigidity to satisfactorily endure an external force or the like irrespective of the position of the motor in which it is used. Thus, the motor is capable of rotating with extremely high accuracy and with minimal vibration and minimal change in the relative height. Even if air is employed as a fluid, bearing rigidity sufficient for practical application can be obtained.

(4) It is unnecessary to apply a preload in the thrust load direction in order to reduce the displacement in the thrust direction as in the conventional drum motor. Conversely, the thrust load can be reduced to approximately zero by applying a preload counter to the thrust load direction. Accordingly, the starting torque of the bearing can be minimized. In addition, the wear on the sliding surfaces of the bearing members can be reduced by a large margin. Therefore, durability under repeated starting and stopping is markedly excellent in comparison to the prior art.

What is claimed is:

1. A drum motor comprising:

a rotor-side bearing member comprising a cylindrical radial bearing element having an outer peripheral surface and respective axial end surfaces, and first and second thrust plates directly contacting the axial end surfaces of said cylindrical radial bearing element, respectively, and extending radially therefrom so as to have mutually facing surfaces, said rotor-side bearing member also having a through-hole extending centrally therethrough;

a stator-side bearing member comprising a cylindrical radial sleeve extending around said cylindrical radial bearing element and interposed between said first and second thrust plates of said rotor-side bearing member, said sleeve having an inner peripheral surface confronting and slidable relative to the outer peripheral surface of the cylindrical radial bearing element of said rotor-side bearing member, and said sleeve having respective axial end surfaces confronting and slidable relative to the mutually facing surfaces of the thrust plates of said rotor-side bearing member, respectively;

at least the surfaces of said stator-side bearing member and said rotor-side bearing member that are slidable relative to each other being of a ceramic material;

one of both of the axial end surfaces of said sleeve and both of the mutually facing surfaces of said thrust plates having dynamic pressure-generating grooves therein such that said axial end surfaces and said mutually facing surfaces constitute hydrodynamic thrust bearings, and the confronting peripheral surfaces of said sleeve and said cylindrical radial bearing element cooperating to constitute a radial bearing;

a rotary shaft extending through the through-hole of said rotor-side bearing member, said rotary shaft having a radially enlarged portion defining a flat surface extending at right angles to the axial direction of said shaft so as to form a step in the shaft, said flat surface being in direct contact with a surface of said first thrust plate that is opposite the surface of the first thrust plate that contacts the axial end surface of said cylindrical radial bearing element;

a cylindrical back yoke of a magnetic material fitted around said rotary shaft, said back yoke having a flat end surface extending at right angles relative to the axial direction thereof, the end surface of said back yoke directly contacting a surface of said second thrust plate that is opposite the surface of said second thrust plate that contacts the axial end surface of said cylindrical radial bearing element;

a rotor magnet secured to said cylindrical back yoke and extending axially therealong;

a motor casing having an inner peripheral surface to which the sleeve of said stator-side bearing member is secured at the outer peripheral surface of said sleeve;

a stator secured to said rotor casing and facing said rotor magnet; and locking means, provided on said rotary shaft, for pressing said back yoke and the thrust plates and the cylindrical radial bearing element of said rotor-side bearing member in the axial direction of said rotary shaft against the flat surface of the radially enlarged portion of said shaft with a predetermined force to thereby integrate said rotor-side bearing member with said rotary shaft.

2. A drum motor as claimed in claim 1, wherein at least one of the outer diameters of said flat surface of the radially enlarged portion of the rotary shaft and said axial end surface of said back yoke is approximately equal to the outer diameter of said cylindrical radial bearing element.

3. A drum motor as claimed in claim 2, wherein an outer peripheral surface of said rotating shaft which extends through said rotor-side bearing member and which faces the through-hole of said rotor-side bearing member has a diameter, $D1$, at $0°$ C. and a surface that defines said through-hole of said rotor-side bearing member has a diameter, $D2$, at $0°$ C. substantially satisfying the following condition:

$$D1(1+\alpha 1 \cdot Tm) = D2(1+\alpha 2 \cdot Tm)$$

where $\alpha 1$ is a coefficient of linear expansion of a material of said rotating shaft; $\alpha 2$ is a coefficient of linear expansion of a material of said rotor-side bearing member; and $Tm°$ C. is a maximum temperature reached by said rotating shaft or said rotor-side bearing member during storage or operation thereof.

4. A drum motor as claimed in claim 1, wherein an outer peripheral surface of said rotating shaft which extends through said rotor-side bearing member and which faces the through-hole of said rotor-side bearing member has a diameter $D1$, at $0°$ C. and a surface that defines said through-hole of said rotor-side bearing member has a diameter $D2$, at $0°$ C. substantially satisfying the following condition:

$$D1(1+\alpha 1 \cdot Tm) = D2(1+\alpha 2 \cdot Tm)$$

where $\alpha 1$ is a coefficient of linear expansion of a material of said rotating shaft; $\alpha 2$ is a coefficient of linear expansion of a material of said rotor-side bearing member; and $Tm°$ C. is a maximum temperature reached by said rotating shaft or said rotor-side bearing member during storage or operation thereof.

5. A drum motor comprising:

a rotor-side bearing member comprising a cylindrical radial bearing element having an outer peripheral surface and respective axial end surfaces, and first and second thrust plates directly contacting the axial end surfaces of said cylindrical radial bearing element, respectively, and extending radially therefrom so as to have mutually facing surfaces, said rotor-side bearing member also having a through-hole extending centrally therethrough;

a stator-side bearing member comprising a cylindrical radial sleeve extending around said cylindrical radial bearing element and interposed between said first and second thrust plates of said rotor-side bearing member, said sleeve having an inner peripheral surface confronting and slidable relative to the outer peripheral surface of the cylindrical radial bearing element of said rotor-side bearing member, and said sleeve having respective axial end surfaces confronting and slidable relative to the mutually facing surfaces of the thrust plates of said rotor-side bearing member, respectively;

at least the surfaces of said stator-side bearing member and said rotor-side bearing member that are slidable relative to each other being of a ceramic material;

one of both of the axial end surfaces of said sleeve and both of the mutually facing surfaces of said thrust plates having dynamic pressure-generating grooves therein such that said axial end surfaces and said mutually facing surfaces constitute hydrodynamic thrust bearings, and the confronting peripheral surfaces of said sleeve and said cylindrical radial bearing element cooperating to constitute a radial bearing;

a rotary shaft extending through the through-hole of said rotor-side bearing member, said rotary shaft having a radially enlarged portion defining a flat surface extending at right angles to the axial direction of said shaft so as to form a step in the shaft, said flat surface being in direct contact with a surface of said first thrust plate that is opposite the surface of the first thrust plate that contacts the axial end surface of said cylindrical radial bearing element, and at least said radially enlarged portion of said rotary shaft being of a magnetic material;

a rotor magnet secured to said rotary shaft;

a motor casing having an inner peripheral surface to which the sleeve of said stator-side bearing member is secured at the outer peripheral surface of said sleeve;

a stator secured to said rotor casing and facing said rotor magnet;

locking means, provided on said rotary shaft, for securing said rotor-side bearing member to said rotary shaft; and preload generating means for generating a magnetic force of a magnitude of at least approximately half of a thrust load attributable to the weight of said rotary shaft and members borne by said shaft and acting on said shaft in a direction counter to said thrust load, said preload generating means comprising a second magnet cooperating with said radially enlarged portion of said rotary shaft to form a magnetic circuit therewith.

6. A drum motor comprising:

a rotor-side bearing member comprising a cylindrical radial bearing element having an outer peripheral surface and respective axial end surfaces, and first and second thrust plates directly contacting the axial end surfaces of said cylindrical radial bearing element, respectively, and extending radially therefrom so as to have mutually facing surfaces, said rotor-side bearing member also having a through-hole extending centrally therethrough;

a stator-side bearing member comprising a cylindrical radial sleeve extending around said cylindrical radial bearing element and interposed between said first and second thrust plates of said rotor-side bearing member, said sleeve having an inner peripheral surface confronting and slidable relative to the outer peripheral surface of the cylindrical radial bearing element of said rotor-side bearing member, and said sleeve having respective axial end surfaces confronting and slidable relative to the mutually facing surfaces of the thrust plates of said rotor-side bearing member, respectively;

at least the surfaces of said stator-side bearing member and said rotor-side bearing member that are slidable relative to each other being of a ceramic material;

one of both of the axial end surfaces of said sleeve and both of the mutually facing surfaces of said thrust plates having dynamic pressure-generating grooves therein such that said axial end surfaces and said mutually facing surfaces constitute hydrodynamic thrust bearings, and the confronting peripheral surfaces of said sleeve and said cylindrical radial bearing element cooperating to constitute a radial bearing;

a rotary shaft extending through the through-hole of said rotor-side bearing member, said rotary shaft having a radially enlarged portion defining first and second flat surfaces each extending at right angles to the axial direction of said shaft so as to form steps in the shaft, said first flat surface being in direct contact with a surface of said first thrust plate opposite the surface of the first thrust plate that contacts the axial end surface of said cylindrical radial bearing element;

a cylindrical back yoke of a magnetic material fitted around said rotary shaft, said back yoke having an axial end surface extending at right angles relative to the axial direction thereof, the end surface of said back yoke directly contacting a surface of said second thrust plate opposite the surface of said second thrust plate that contacts the axial end surface of said cylindrical radial bearing element;

a rotor magnet secured to said cylindrical back yoke and extending axially therealong;

a motor casing having an inner peripheral surface to which the sleeve of said stator-side bearing member is secured at the outer peripheral surface of said sleeve;

a stator secured to said rotor casing and facing said rotor magnet;

first locking means, provided on said rotary shaft, for pressing said back yoke and the thrust plates and the cylindrical radial bearing element of said rotor-side bearing member in the axial direction of said rotary shaft against the first flat surface of the radially enlarged portion of said shaft with a predetermined force to thereby integrate said rotor-side bearing member with said rotary shaft;

a mounting flange having a central through-hole through which said rotary shaft extends so that said flange is fitted around said shaft, and an end surface directly contacting the second flat surface of the radially enlarged portion of said rotary shaft; and second locking means, provided on said rotary shaft, for pressing said mounting flange against the second flat surface of the radially enlarged portion of said shaft with a predetermined force to thereby integrate said mounting flange with said rotary shaft.

7. A drum motor as claimed in claim 6, wherein at least one of the outer diameters of said first and second flat surfaces, the axial end surface of said back yoke and the end surface of said flange is approximately equal to the outer diameter of said radial bearing element.

8. A drum motor as claimed in claim 7, wherein the forces exerted by said first and second locking means act in directions axially counter to each other and are approximately equal to each other in magnitude.

9. A drum motor as claimed in claim 8, wherein an outer peripheral surface of said rotating shaft which extends through said rotor-side bearing member and which faces the through-hole of said rotor-side bearing member has a diameter, D1, at 0° C., a surface defining the through-hole of said rotor-side bearing member has a diameter, D2, at 0° C., an outer peripheral surface of said rotating shaft which extends through said flange and which faces the through-hole of said flange has a diameter, D3, at 0° C., and a surface defining the through-hole of said flange has a diameter, D4, at 0° C. substantially satisfying at least one of the following two conditions:

$$D1(1+\alpha 1 \cdot Tm)=D2(1+\alpha 2 \cdot Tm)$$

and $$D3(1+\alpha 1 \cdot Tm)=D4(1+\alpha 3 \cdot Tm)$$

where α1 is a coefficient of linear expansion of a material of said rotating shaft; α2 is a coefficient of linear expansion of a material of said rotor-side bearing member; α3 is a coefficient of linear expansion of a material of said flange; and Tm° C. is a maximum temperature reached by said rotating shaft or said rotor-side bearing member during storage or operation thereof.

10. A drum motor as claimed in claim 7, wherein an outer peripheral surface of said rotating shaft which extends through said rotor-side bearing member and which faces the through-hole of said rotor-side bearing member has a diameter, D1, at 0° C., a surface defining the through-hole of said rotor-side bearing member has a diameter D2, at 0° C., an outer peripheral surface of said rotating shaft which extends through said flange and which faces the through-hole of said flange has a diameter, D3, at 0° C., and a surface defining the through-hole of said flange has a diameter, D4, at 0° C. substantially satisfying at least one of the following two conditions:

$$D1(1+\alpha 1 \cdot Tm)=D2(1+\alpha 2 \cdot Tm)$$

and $$D3(+\alpha 1 \cdot Tm)=D4(1+\alpha 3 \cdot Tm)$$

where α1 is a coefficient of linear expansion of a material of said rotating shaft; α2 is a coefficient of linear expansion of a material of said rotor-side bearing member; α3 is a coefficient of linear expansion of a material of said flange; and Tm° C. is a maximum temperature reached by said rotating shaft or said rotor-side bearing member during storage or operation thereof.

11. A drum motor as claimed in claim 6, wherein the forces exerted by said first and second locking means act in directions axially counter to each other and are approximately equal to each other in magnitude.

12. A drum motor as claimed in claim 11, wherein an outer peripheral surface of said rotating shaft which extends through said rotor-side bearing member and which faces the through-hole of said rotor-side bearing member has a diameter, D1, at 0° C., a surface defining the through-hole of said rotor-side bearing member has a diameter, D2, at 0° C., an outer peripheral surface of said rotating shaft which extends through said flange and which faces the through-hole of said flange has a diameter, D2, at 0° C., and a surface defining the through-hole of said flange has a diameter, D4, at 0° C. substantially satisfying at least one of the following two conditions:

$$D1(1+\alpha 1 \cdot Tm)=D2(1+\alpha 2 \cdot Tm)$$

and $$D3(1+\alpha 1 \cdot Tm)=D4(1+\alpha 3 \cdot Tm)$$

where α1 is a coefficient of linear expansion of a material of said rotating shaft; α2 is a coefficient of linear expansion of a material of said rotor-side bearing member; α3 is a coefficient of linear expansion of a material of said flange; and Tm° C. is a maximum temperature reached by said rotating shaft or said rotor-side bearing member during storage or operation thereof.

13. A drum motor as claimed in claim 6, wherein an outer peripheral surface of said rotating shaft which extends through said rotor-side bearing member and which faces the through-hole of said rotor-side bearing member has a diameter, D1, at 0° C., a surface defining the through-hole of said rotor-side bearing member has a diameter, D2, at 0° C., an outer peripheral surface of said rotating shaft which extends through said flange and which faces the through-hole of said flange has a diameter, D3, at 0° C., and a surface defining the through-hole of said flange has a diameter, D4, at 0° C. substantially satisfying at least one of the following two conditions:

$$D1(1+\alpha 1 \cdot Tm)=D2(1+\alpha 2 \cdot Tm)$$

and $$D3(1+\alpha 1 \cdot Tm)=D4(1+\alpha 3 \cdot Tm)$$

where α1 is a coefficient of linear expansion of a material of said rotating shaft; α2 is a coefficient of linear expansion of a material of said rotor-side bearing member; α3 is a coefficient of linear expansion of a material of said flange; and Tm° C. is a maximum temperature reached by said rotating shaft or said rotor-side bearing member during storage or operation thereof.

14. A drum motor comprising:

a rotor-side bearing member comprising a cylindrical radial bearing element having an outer peripheral surface and respective axial end surfaces, and first and second thrust plates directly contacting the axial end surfaces of said cylindrical radial bearing element, respectively, and extending radially therefrom so as to have mutually facing surfaces, said rotor-side bearing member also having a through-hole extending centrally therethrough;

a stator-side bearing member comprising a cylindrical radial sleeve extending around said cylindrical radial bearing element and interposed between said first and second thrust plates of said rotor-side bearing member, said sleeve having an inner peripheral surface confronting and slidable relative to the outer peripheral surface of the cylindrical radial bearing element of said rotor-side bearing member, and said sleeve having respective axial end surfaces confronting and slidable relative to the mutually facing surfaces of the thrust plates of said rotor-side bearing member, respectively;

at least the surfaces of said stator-side bearing member and said rotor-side bearing member that are slidable relative to each other being of a ceramic material;

one of both of the axial end surfaces of said sleeve and both of the mutually facing surfaces of said thrust plates having dynamic pressure-generating grooves therein such that said axial end surfaces and said mutually facing surfaces constitute hydrodynamic thrust bearings, and the confronting peripheral surfaces of said sleeve and said cylindrical radial bearing element cooperating to constitute a radial bearing;

a rotary shaft extending through the through-hole of said rotor-side bearing member, said rotary shaft having a radially enlarged portion defining a flat surface extending at right angles to the axial direction of said shaft so as to form a step in the shaft, said flat surface being in direct contact with a surface of said first thrust plate that is opposite the surface of the first thrust plate that contacts the axial end surface of said cylindrical radial bearing element, and at least said radially enlarged portion of said rotary shaft being of a magnetic material;

a rotor magnet secured to said rotary shaft;

a motor casing having an inner peripheral surface to which the sleeve of said stator-side bearing member is secured at the outer peripheral surface of said sleeve;

a stator secured to said rotor casing and facing said rotor magnet;

first locking means, provided on said rotary shaft, for securing said rotor-side bearing member to said rotary shaft;

a mounting flange having a central through-hole through which said rotary shaft extends so that said flange is fitted around said shaft, and an end surface directly contacting the second flat surface of the radially enlarged portion of said rotary shaft;

second locking means, provided on said rotary shaft, for pressing said mounting flange against the second flat surface of the radially enlarged portion of said shaft with a predetermined force to thereby integrate said mounting flange with said rotary shaft; and preload generating means for generating a magnetic force of a magnitude of at least approximately half of a thrust load attributable to the weight of said rotary shaft and members borne by said shaft and acting on said shaft in a direction counter to said thrust load, said preload generating means comprising a second magnet cooperating with said radially enlarged portion of said rotary shaft to form a magnetic circuit therewith.

* * * * *